(12) United States Patent
Sandoval (10) Patent No.: US 12,491,107 B1
(45) Date of Patent: Dec. 9, 2025

(54) FEMALE GENITALIA PROTECTIVE SHEATH APPARATUS

(71) Applicant: Jose Sandoval, Caguas, OR (US)

(72) Inventor: Jose Sandoval, Caguas, OR (US)

( * ) Notice: Subject to any disclaimer, the term of this patent is extended or adjusted under 35 U.S.C. 154(b) by 182 days.

(21) Appl. No.: 18/195,671

(22) Filed: May 10, 2023

Related U.S. Application Data

(60) Provisional application No. 63/340,508, filed on May 11, 2022.

(51) Int. Cl.
*A61F 6/06* (2006.01)
*A61H 19/00* (2006.01)

(52) U.S. Cl.
CPC ............. *A61F 6/065* (2013.01); *A61H 19/30* (2013.01); *A61H 19/50* (2013.01)

(58) Field of Classification Search
CPC .. A61F 6/06; A61F 6/065; A61F 13/00; A61F 6/04; A61F 2006/049; A61F 2006/041; A61F 2006/042; A61H 19/30; A61H 19/50; A61B 46/00; A61C 5/82; A61C 5/88; A61C 19/00; A61C 19/001; G09B 19/0076
See application file for complete search history.

(56) References Cited

U.S. PATENT DOCUMENTS

| | | | |
|---|---|---|---|
| 2,591,783 A | 4/1952 | Craddock | |
| 5,269,320 A | 12/1993 | Hunnicutt | |
| D523,552 S | 6/2006 | Nordahl et al. | |
| 10,258,497 B2 | 4/2019 | Tang | |
| 2015/0157493 A1 | 6/2015 | Agha | |
| 2016/0374850 A1* | 12/2016 | Agha | A61F 6/065 |
| | | | 128/830 |
| 2017/0231808 A1* | 8/2017 | Agha | A61F 6/04 |
| | | | 128/844 |

FOREIGN PATENT DOCUMENTS

| | | |
|---|---|---|
| CN | 201642506 U | 11/2010 |
| CN | 202235794 U | 5/2012 |
| CN | 211750457 U | 10/2020 |
| HU | 225515 B1 | 1/2007 |
| WO | 2013020361 A1 | 2/2013 |

* cited by examiner

*Primary Examiner* — Ophelia A Hawthorne
(74) *Attorney, Agent, or Firm* — MALLOY & MALLOY PL; Rafay Asrar, Esq.

(57) ABSTRACT

A protective sheath apparatus for female genitalia includes a flexible and deformable stimulus pad positioned between a first and second protective layer. Each protective layer includes an adhesive frame at its periphery, which enables the apparatus to be secured to the user. Removable frame covers are attached to the adhesive frames to preserve sterility before use. A handle is laterally connected to the stimulus pad and at least one protective layer to assist with application and manipulation. The stimulus pad may include air bubbles, protrusions, spikes, or moving elements arranged in various configurations to provide tactile stimulation. The apparatus is configured to cover the female genital region with the protective layers on either side of the stimulus pad.

18 Claims, 13 Drawing Sheets

FEMALE GENITALIA PROTECTIVE SHEATH APPARATUS

CROSS-REFERENCE TO RELATED APPLICATIONS

This application claims the benefit of U.S. Provisional Patent Application No. 63/340,508, filed on May 11, 2022, which is incorporated by reference herein in its entirety.

FIELD OF THE INVENTION

The present invention relates generally to health industry/diseases prevention/prophylactics, and more particularly, to a female genitalia protective sheath apparatus.

BACKGROUND OF THE INVENTION

A condom is a sheath-shaped barrier device used during sexual intercourse to reduce the probability of pregnancy or a sexually transmitted infection (STI). With proper use—and use at every act of intercourse—women whose partners use male condoms experience a 2% per-year pregnancy rate. With typical use the rate of pregnancy is 18% per-year. Their use greatly decreases the risk of gonorrhea, chlamydia, trichomoniasis, hepatitis B, and HIV/AIDS. To a lesser extent, they also protect against genital herpes, human papillomavirus (HPV), and syphilis.

The male condom is rolled onto an erect penis before intercourse and works by forming a physical barrier which blocks semen from entering the body of a sexual partner. Male condoms are typically made from latex and, less commonly, from polyurethane, polyisoprene, or lamb intestine. Male condoms have the advantages of ease of use, easy to access, and few side effects. Men with a latex allergy should use condoms made from a material other than latex, such as polyurethane.

Condoms as a method of preventing STIs have been used since at least 1564. Rubber condoms became available in 1855, followed by latex condoms in the 1920s. It is on the World Health Organization's List of Essential Medicines. As of 2019, globally around 21% of those using birth control use the condom, making it the second-most common method after female sterilization (24%). Rates of condom use are highest in East and Southeast Asia, Europe and North America. About six to nine billion are sold a year.

Birth control. The effectiveness of condoms, as of most forms of contraception, can be assessed two ways. Perfect use or method effectiveness rates only include people who use condoms properly and consistently. Actual use, or typical use effectiveness rates are of all condom users, including those who use condoms incorrectly or do not use condoms at every act of intercourse. Rates are generally presented for the first year of use. Most commonly the Pearl Index is used to calculate effectiveness rates, but some studies use decrement tables.

The typical use pregnancy rate among condom users varies depending on the population being studied, ranging from 10 to 18% per year. The perfect use pregnancy rate of condoms is 2% per year. Condoms may be combined with other forms of contraception (such as spermicide) for greater protection.

Sexually transmitted infections. Condoms are widely recommended for the prevention of sexually transmitted infections (STIs). They have been shown to be effective in reducing infection rates in both men and women. While not perfect, the condom is effective at reducing the transmission of organisms that cause AIDS, genital herpes, cervical cancer, genital warts, syphilis, chlamydia, gonorrhea, and other diseases. Condoms are often recommended as an adjunct to more effective birth control methods (such as IUD) in situations where STD protection is also desired.

According to a 2000 report by the National Institutes of Health (NIH), consistent use of latex condoms reduces the risk of HIV transmission by approximately 85% relative to risk when unprotected, putting the seroconversion rate (infection rate) at 0.9 per 100 person-years with condom, down from 6.7 per 100 person-years. Analysis published in 2007 from the University of Texas Medical Branch and the World Health Organization found similar risk reductions of 80-95%.

The 2000 NIH review concluded that condom use significantly reduces the risk of gonorrhea for men. A 2006 study reports that proper condom use decreases the risk of transmission of human papillomavirus (HPV) to women by approximately 70%. Another study in the same year found consistent condom use was effective at reducing transmission of herpes simplex virus-2, also known as genital herpes, in both men and women.

Although a condom is effective in limiting exposure, some disease transmission may occur even with a condom. Infectious areas of the genitals, especially when symptoms are present, may not be covered by a condom, and as a result, some diseases like HPV and herpes may be transmitted by direct contact. The primary effectiveness issue with using condoms to prevent STDs, however, is inconsistent use.

Condoms may also be useful in treating potentially precancerous cervical changes. Exposure to human papillomavirus, even in individuals already infected with the virus, appears to increase the risk of precancerous changes. The use of condoms helps promote regression of these changes. In addition, researchers in the UK suggest that a hormone in semen can aggravate existing cervical cancer, condom use during sex can prevent exposure to the hormone.

There remains a need in the market for a product to protect the female vagina when receiving oral sex. For men there is a product to keep them safe while having intercourse and this same product keep them safe during oral sex, which is what we know as condoms. On the other hand, for females, there remains a gap in the market for products that protect them while receiving oral sex. Additionally, a desired product would also case wearability and limit diminished sensations for the user.

Accordingly, there is need for a solution to at least one of the aforementioned problems.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present invention is directed toward a female genitalia protective sheath apparatus.

According to an embodiment of the present invention, the female genitalia protective sheath apparatus may comprise a stimulus pad, a first protective layer, a second protective layer, a first adhesive frame, a second adhesive frame, a first frame cover, a second frame cover, and a handle.

According to an embodiment of the present invention, the stimulus pad may comprise latex materials.

According to an embodiment of the present invention, the stimulus pad may comprise plastic materials.

According to an embodiment of the present invention, the stimulus pad may comprise rubber materials.

According to an embodiment of the present invention, the stimulus pad may comprise other materials that are more friendly to users with allergies and the environment.

According to an embodiment of the present invention, the stimulus pad may be flexible and deformable.

According to an embodiment of the present invention, the stimulus pad may comprise air bubbles.

According to an embodiment of the present invention, the stimulus pad may comprise protrusions or spikes formed on at least one surface thereof and arranged in wave patterns, triangle patterns, string patterns, and/or dot patterns.

According to an embodiment of the present invention, the stimulus pad may be a ball pit sack.

According to an embodiment of the present invention, the first protective layer may be superposed onto the stimulus pad.

According to an embodiment of the present invention, the first protective layer may comprise plastic materials.

According to an embodiment of the present invention, the first protective layer may comprise other materials that are more friendly to users with allergies and the environment.

According to an embodiment of the present invention, the first protective layer may be flexible and deformable.

According to an embodiment of the present invention, the second protective layer may be superposed onto the stimulus pad.

According to an embodiment of the present invention, the second protective layer may comprise plastic materials.

According to an embodiment of the present invention, the second protective layer may comprise other materials that are more friendly to users with allergies and the environment.

According to an embodiment of the present invention, the second protective layer may be flexible and deformable.

According to an embodiment of the present invention, the stimulus pad may be located between the first protective layer and the second protective layer.

According to an embodiment of the present invention, the first adhesive frame may be fixed to a periphery of the first protective layer.

According to an embodiment of the present invention, the first adhesive frame may be oppositely located to the stimulus pad.

According to an embodiment of the present invention, the second adhesive frame may be fixed to a periphery of the second protective layer.

According to an embodiment of the present invention, the second adhesive frame may be oppositely located to the stimulus pad.

According to an embodiment of the present invention, the first frame cover may be removably attached to the first adhesive frame.

According to an embodiment of the present invention, the first frame cover may comprise paper materials.

According to an embodiment of the present invention, the second frame cover may be removably attached to the second adhesive frame.

According to an embodiment of the present invention, the second frame cover may comprise paper materials.

According to an embodiment of the present invention, the handle may be laterally connected with the stimulus pad, the first protective layer, and/or the second protective layer.

According to an embodiment of the present invention, the handle may comprise rigid materials.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

These and other objects, features, and advantages of the present invention will become more readily apparent from the attached drawings and the detailed description of the preferred embodiments, which follow.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

Shown throughout FIGS. 1-10, the present invention is directed toward a female genitalia protective sheath apparatus 100.

According to an embodiment of the present invention, the female genitalia protective sheath apparatus 100 may comprise a stimulus pad 102, a first protective layer 104, a second protective layer 106, a first adhesive frame 108, a second adhesive frame 110, a first frame cover 112, a second frame cover 114, and a handle 116.

According to an embodiment of the present invention, the stimulus pad 102 may comprise latex materials.

According to an embodiment of the present invention, the stimulus pad 102 may comprise plastic materials.

According to an embodiment of the present invention, the stimulus pad 102 may comprise rubber materials.

According to an embodiment of the present invention, the stimulus pad 102 may comprise other materials that are more friendly to users with allergies and the environment.

Figure 1:
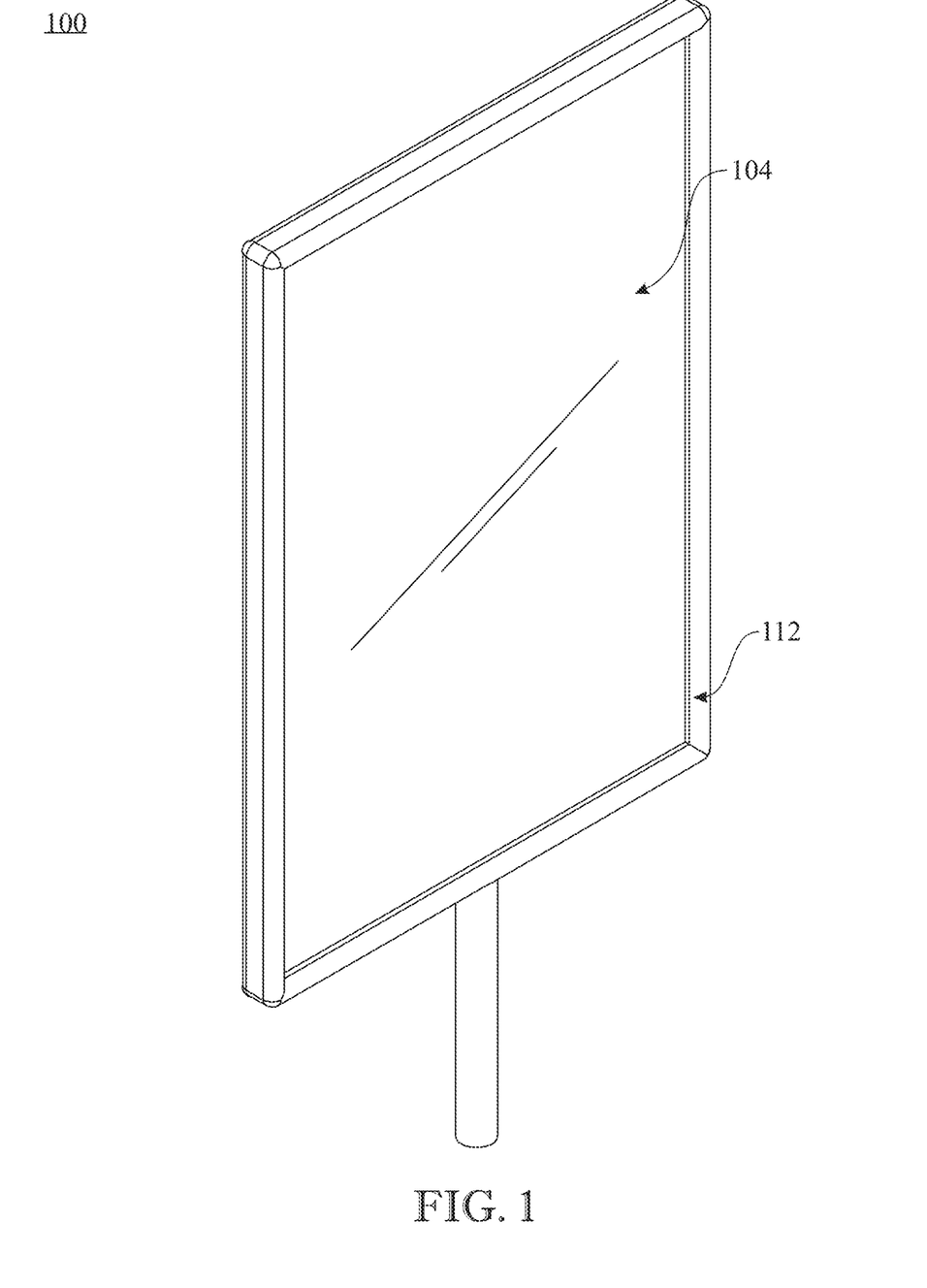
FIG. 1 presents a perspective view of a female genitalia protective sheath apparatus of the present invention.
Figure 2:
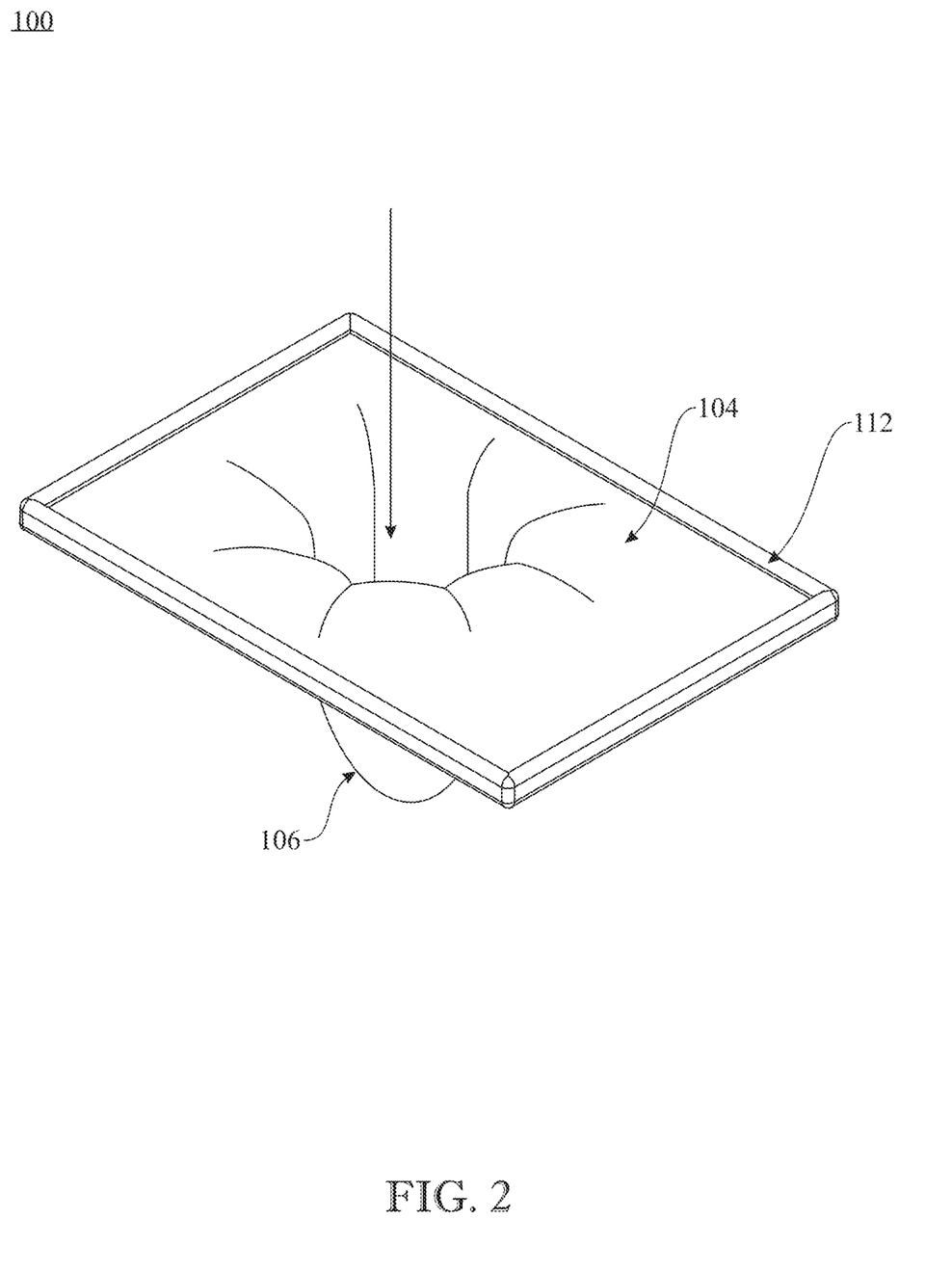
FIG. 2 presents a perspective view showing that the female genitalia protective sheath apparatus of the present invention is flexible and deformable.
Figure 3:
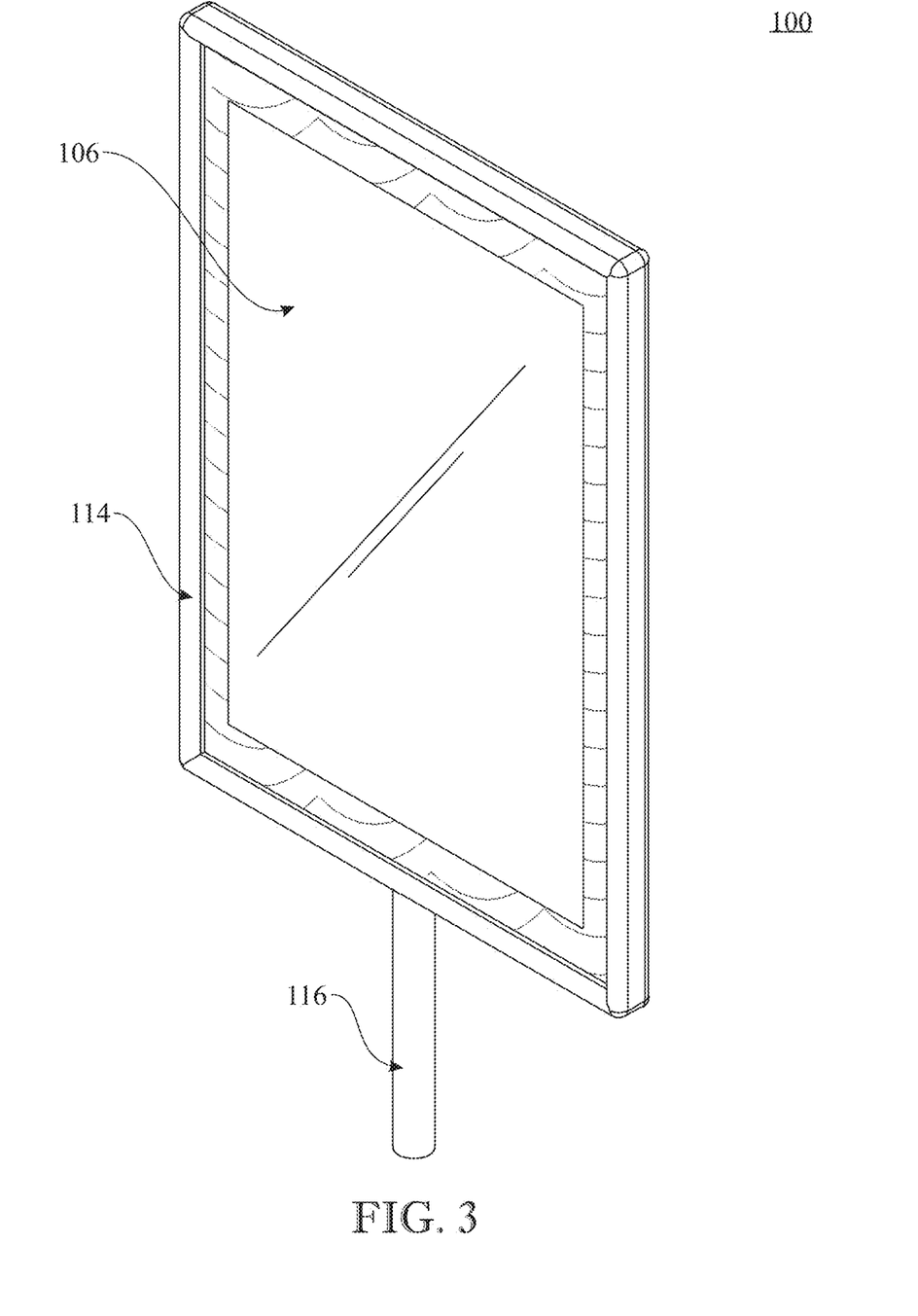
FIG. 3 presents another perspective view of the female genitalia protective sheath apparatus of the present invention.

According to an embodiment of the present invention, the stimulus pad 102 may be flexible and deformable, as illustrated in FIG. 2.

Figure 7:
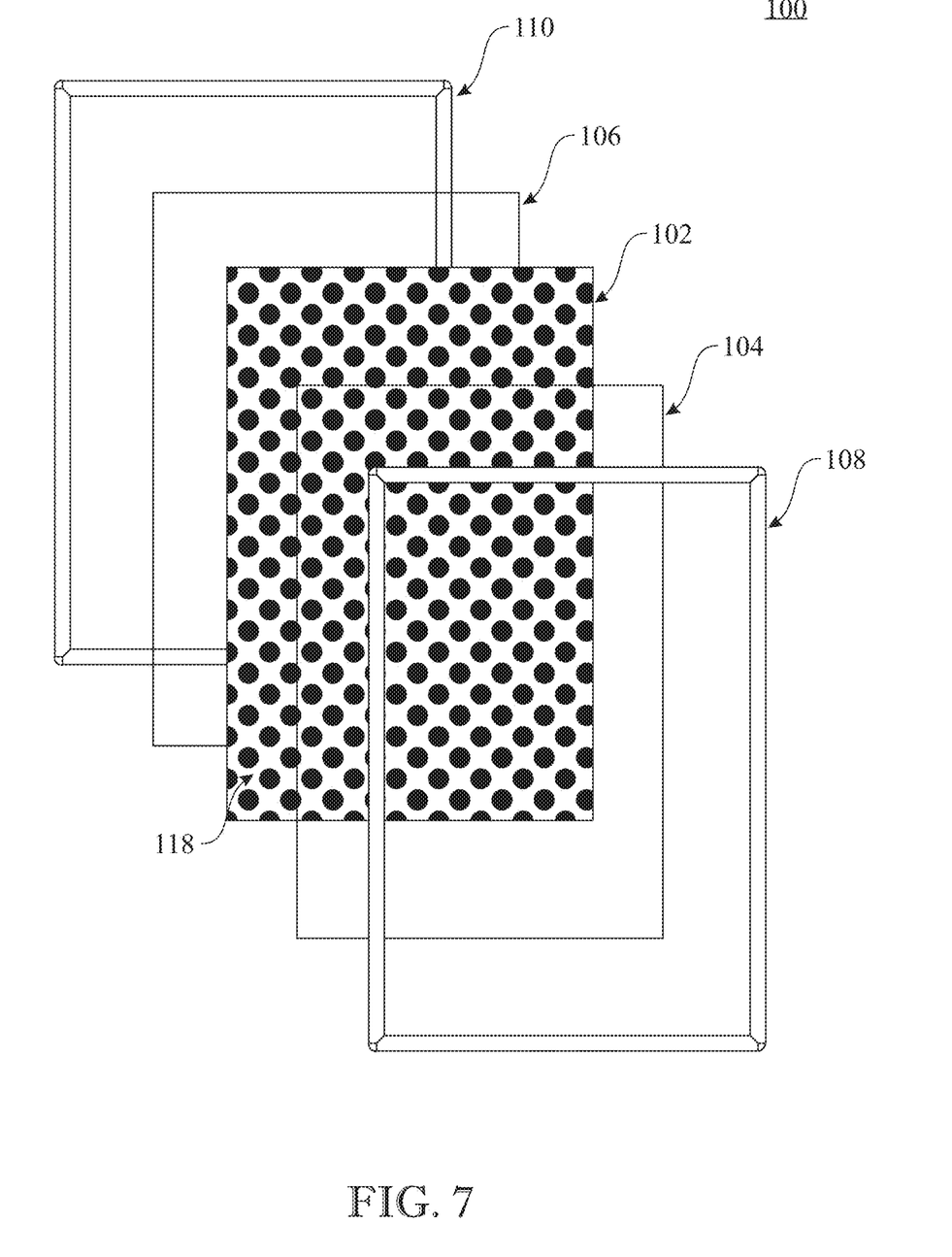
FIG. 7 presents an exploded view of the female genitalia protective sheath apparatus according to a first embodiment the present invention.

According to an embodiment of the present invention, the stimulus pad 102 may comprise air bubbles, as illustrated in FIG. 7.

Figure 8:
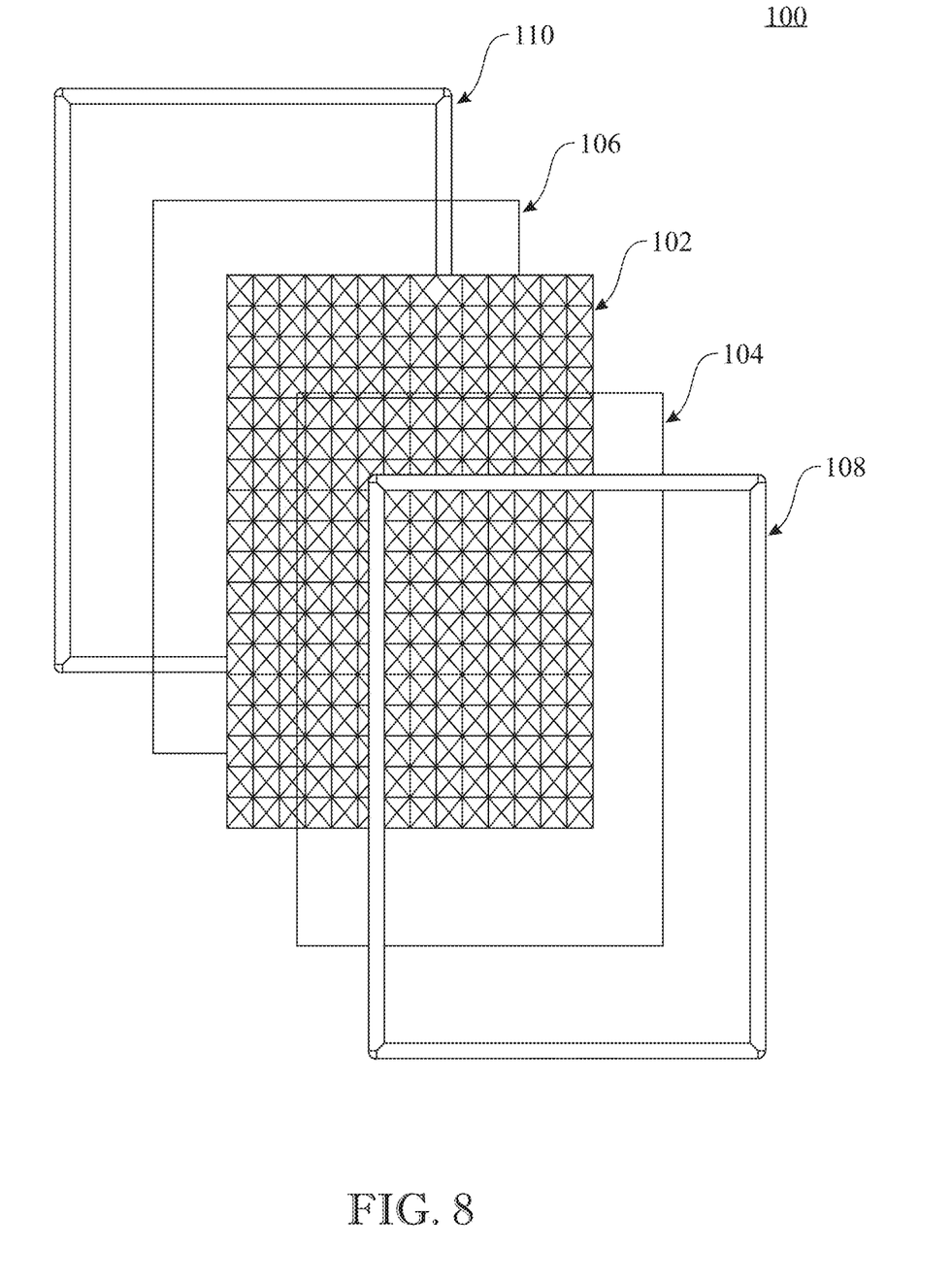
FIG. 8 presents an exploded view of the female genitalia protective sheath apparatus according to a second embodiment the present invention.
Figure 9:
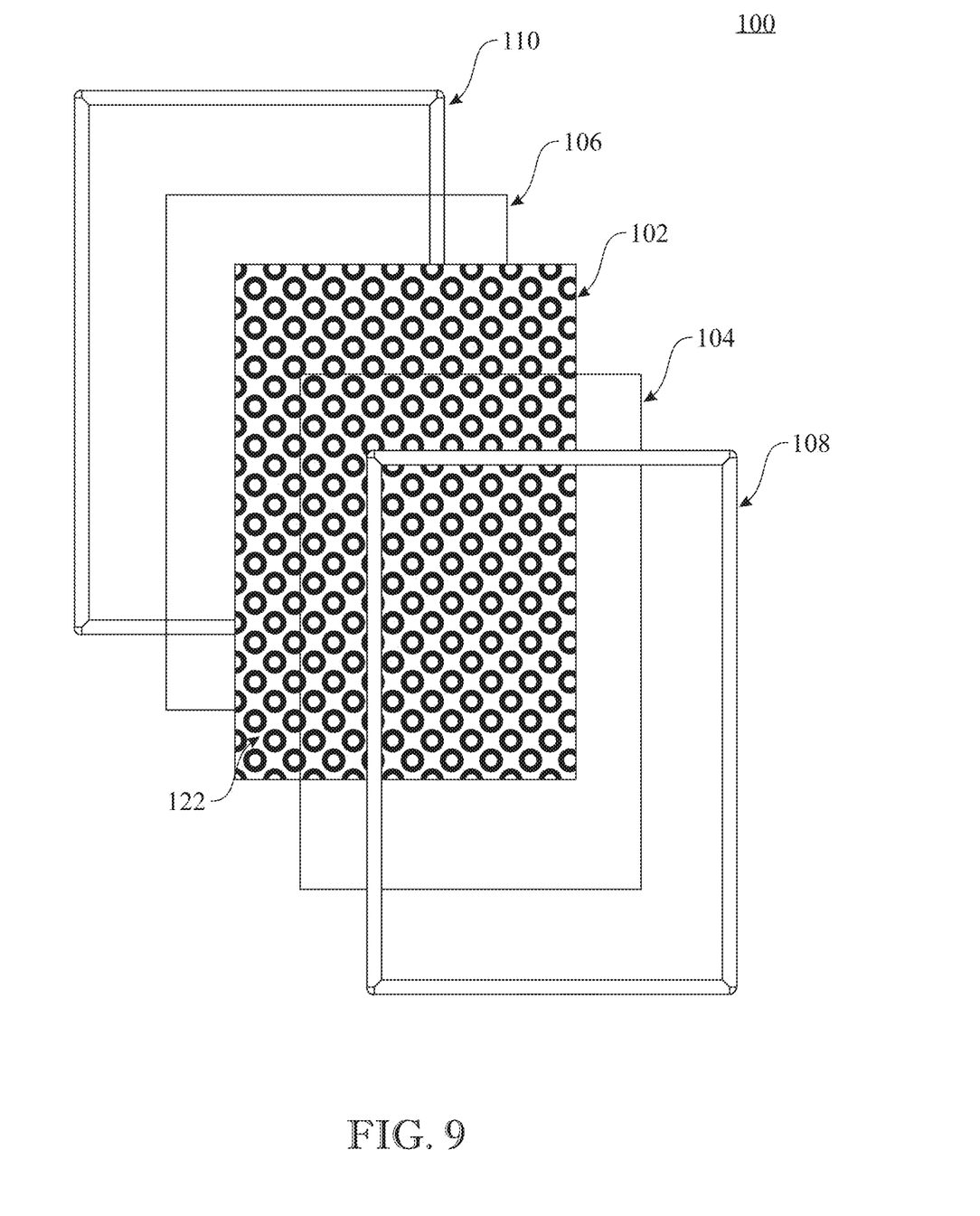
FIG. 9 presents an exploded view of the female genitalia protective sheath apparatus according to a third embodiment the present invention.
Figure 10:
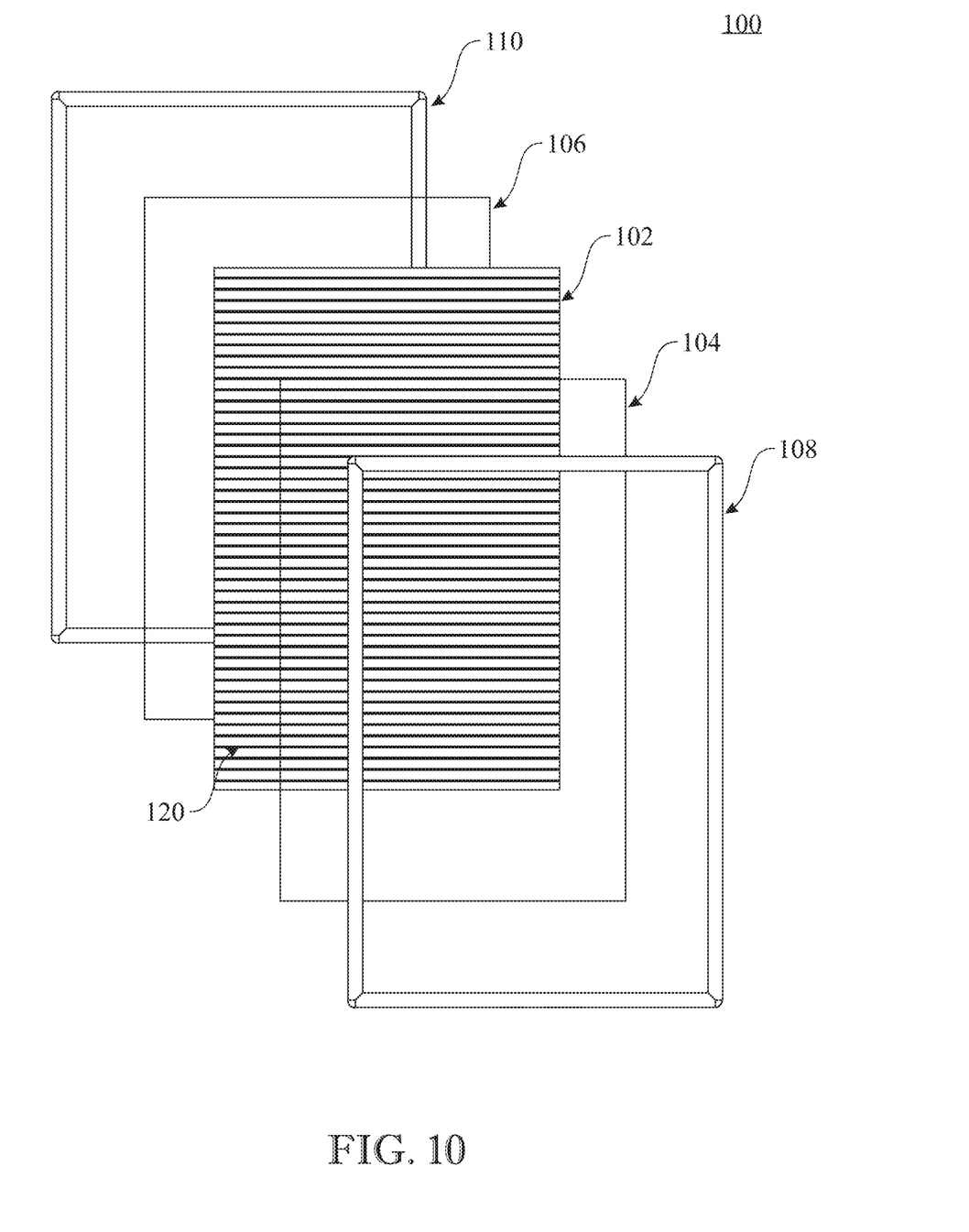
FIG. 10 presents an exploded view of the female genitalia protective sheath apparatus according to a fourth embodiment the present invention.
Figure 12:
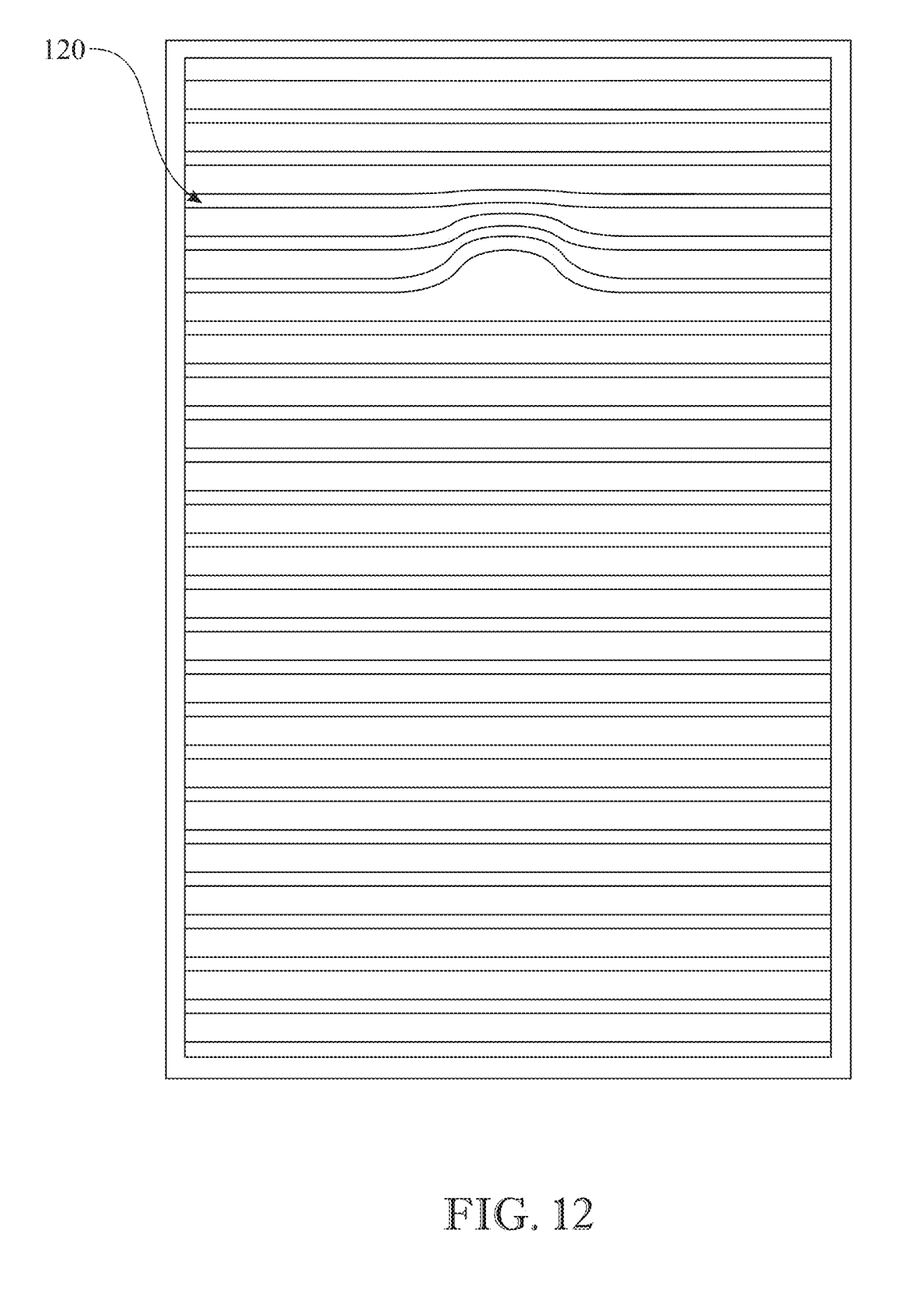
FIG. 12 presents a perspective view showing a plurality of string-like protrusions arranged across the stimulus pad surface, the protrusions returning to position after deformation according to an embodiment of the present invention.
Figure 13:
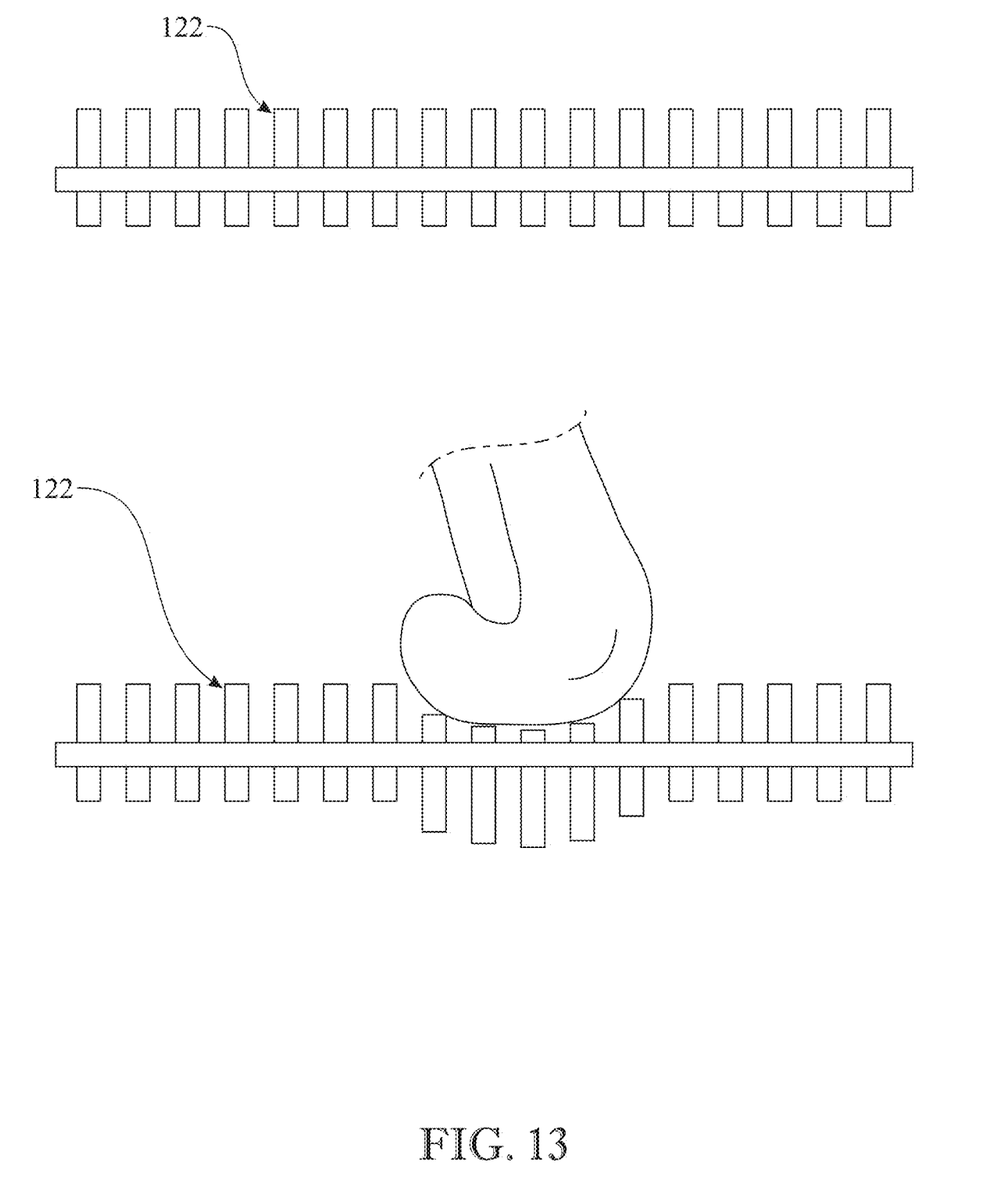
FIG. 13 presents a perspective view showing a plurality of column-type protrusions that flex laterally under pressure and return to place upon release according to an embodiment of the present invention.

According to an embodiment of the present invention, the stimulus pad 102 may comprise protrusions or spikes formed on at least one surface thereof and arranged in wave patterns, triangle patterns, string patterns, and/or dot patterns, as illustrated in FIGS. 8-10. The protrusions or spikes are used as tongue stimulus configuration like sexual stimulators. Particularly, as illustrated in FIGS. 10 and 12, the protrusions may be strings 120 (like guitar strings) which return to place as the stimulus pad 102 is touched around. Particularly, as illustrated in FIGS. 9 and 13, the protrusions may be little columns 122 that move toward one side of the stimulus pad 102 when pressed from the other side of the stimulus pad 102, and the columns 122 go back into place when released.

Figure 11:
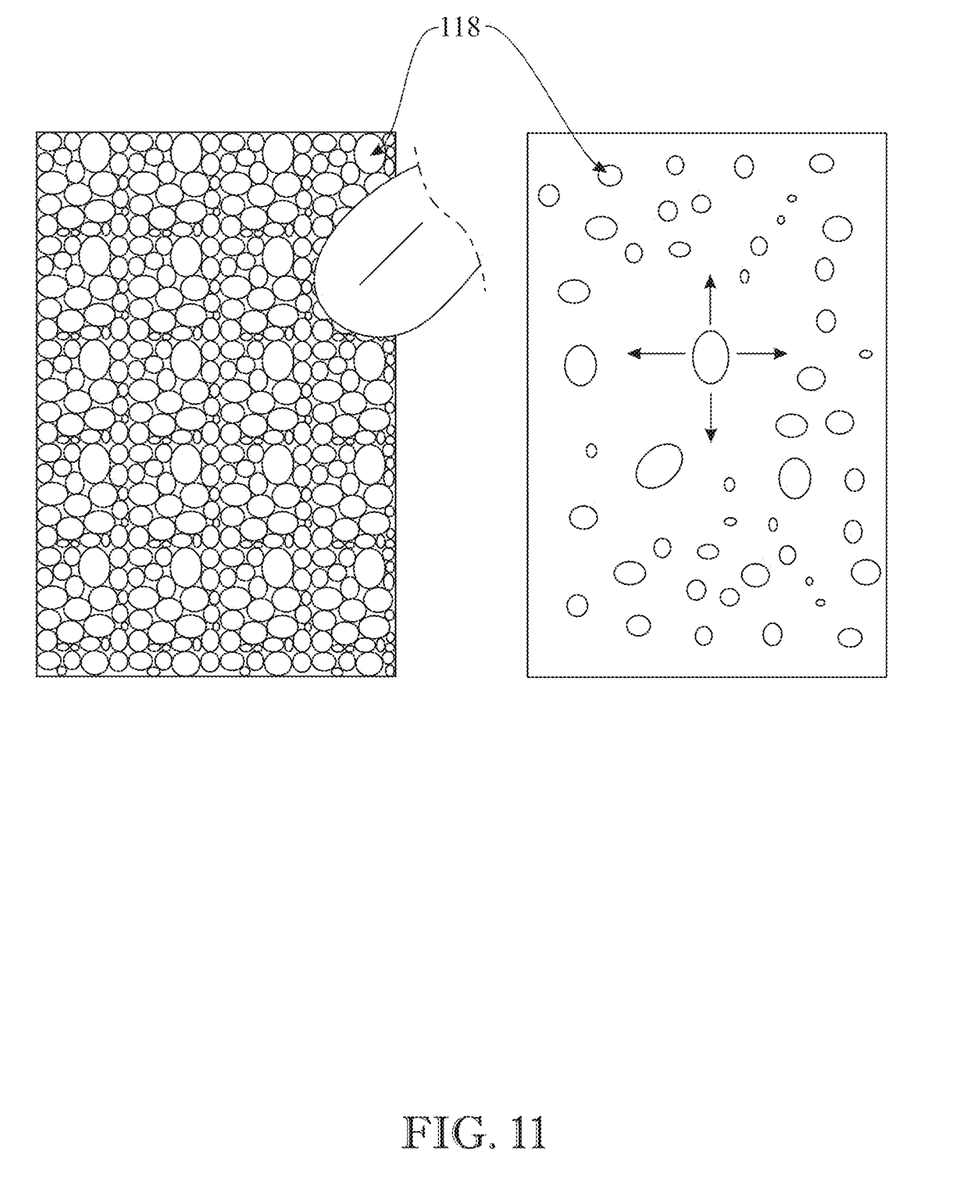
FIG. 11 presents a perspective view showing a ball-pit-type stimulus pad of the female genitalia protective sheath apparatus, wherein little balls within the pad move when pressed to provide a wave-motion stimulus according to an embodiment of the present invention.

According to an embodiment of the present invention, the stimulus pad 102 may be a ball pit sack which may be able to provide a wave motion stimulus, as illustrated in FIGS. 7 and 11. Specifically, the stimulus pad 102 may have little balls 118 that moves when the stimulus pad 102 is pressed, as illustrated in FIG. 11.

According to an embodiment of the present invention, the first protective layer 104 may be superposed onto the stimulus pad 102, as illustrated in FIGS. 7-10.

According to an embodiment of the present invention, the first protective layer 104 may comprise plastic materials.

According to an embodiment of the present invention, the first protective layer 104 may comprise other materials that are more friendly to users with allergies and the environment.

According to an embodiment of the present invention, the first protective layer 104 may be flexible and deformable, as illustrated in FIG. 2.

According to an embodiment of the present invention, the second protective layer 106 may be superposed onto the stimulus pad 102, as illustrated in FIGS. 7-10.

According to an embodiment of the present invention, the second protective layer 106 may comprise plastic materials.

According to an embodiment of the present invention, the second protective layer 106 may comprise other materials that are more friendly to users with allergies and the environment.

According to an embodiment of the present invention, the second protective layer 106 may be flexible and deformable, as illustrated in FIG. 2.

According to an embodiment of the present invention, the stimulus pad 102 may be located between the first protective layer 104 and the second protective layer 106, as illustrated in FIGS. 7-10.

According to an embodiment of the present invention, the first adhesive frame 108 may be fixed to a periphery of the first protective layer 104, as illustrated in FIGS. 3-4 and 7-10. For example, the first adhesive frame 108 may be a sticky glue surface on a border of the first protective layer 104.

According to an embodiment of the present invention, the first adhesive frame 108 may be oppositely located to the stimulus pad 102, as illustrated in FIGS. 7-10.

According to an embodiment of the present invention, the second adhesive frame 110 may be fixed to a periphery of the second protective layer 106, as illustrated in FIGS. 3-4 and 7-10. For example, the second adhesive frame 110 may be a sticky glue surface on a border of the second protective layer 106.

According to an embodiment of the present invention, the second adhesive frame 110 may be oppositely located to the stimulus pad 102, as illustrated in FIGS. 7-10.

According to an embodiment of the present invention, as illustrated in FIGS. 3-4 and 7-10, the first frame cover 112 may be removably attached to the first adhesive frame 108, such that the first frame cover 112 may be peelable from the first adhesive frame 108.

According to an embodiment of the present invention, the first frame cover 112 may comprise paper materials.

According to an embodiment of the present invention, as illustrated in FIGS. 3-4 and 7-10, the second frame cover 114 may be removably attached to the second adhesive frame 110, such that the second frame cover 114 may be peelable from the second adhesive frame 110.

According to an embodiment of the present invention, the second frame cover 114 may comprise paper materials.

According to an embodiment of the present invention, as illustrated in FIGS. 1 and 3-10, the handle 116 may be laterally connected with the stimulus pad 102, the first protective layer 104, and/or the second protective layer 106, such that a user may better manipulate the female genitalia protective sheath apparatus 100 by holding the handle 116.

According to an embodiment of the present invention, the handle 116 may comprise rigid materials.

Figure 5:
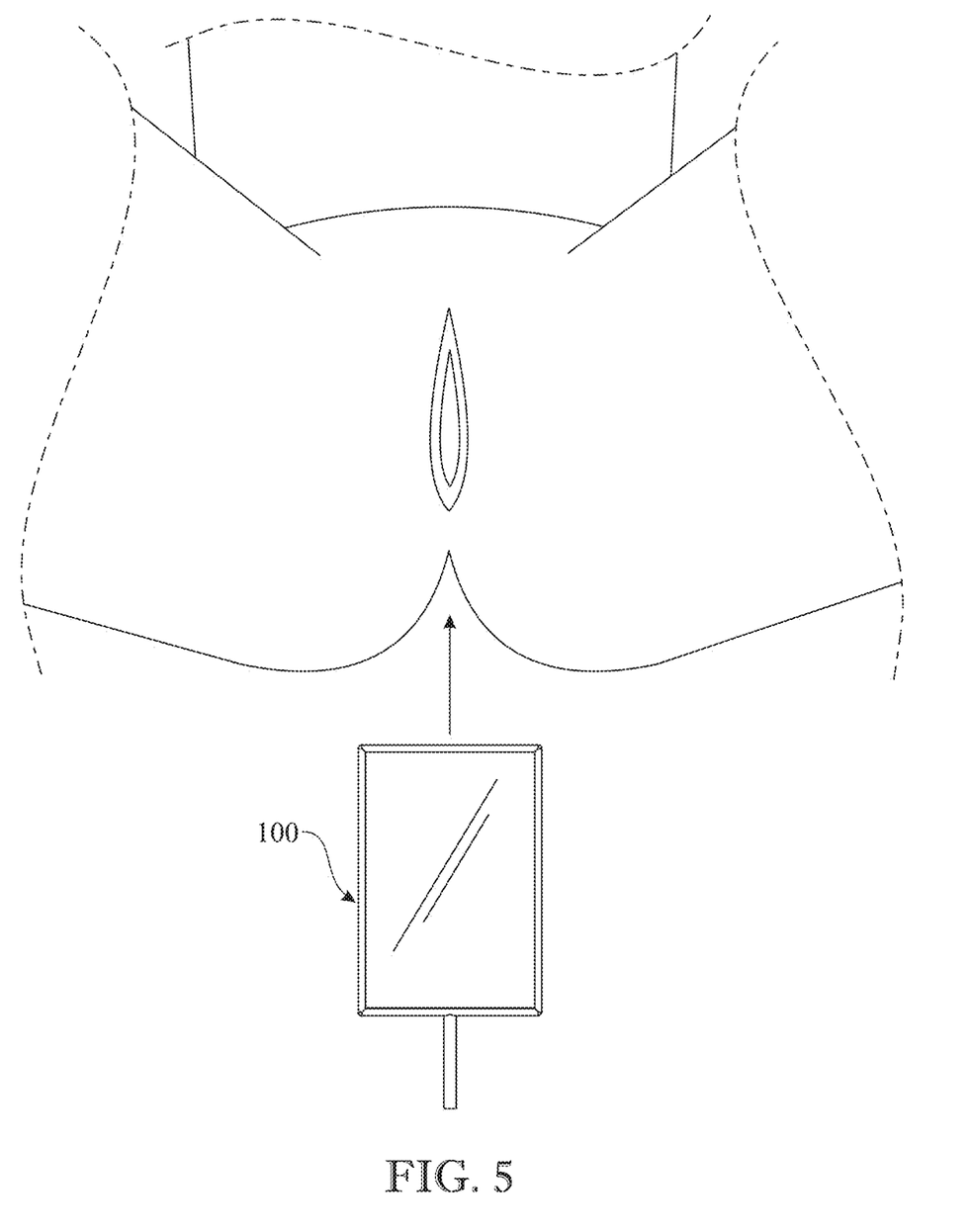
FIG. 5 presents a perspective view showing that the female genitalia protective sheath apparatus is going to be used to cover female genitalia according to an embodiment of the present invention.
Figure 6:
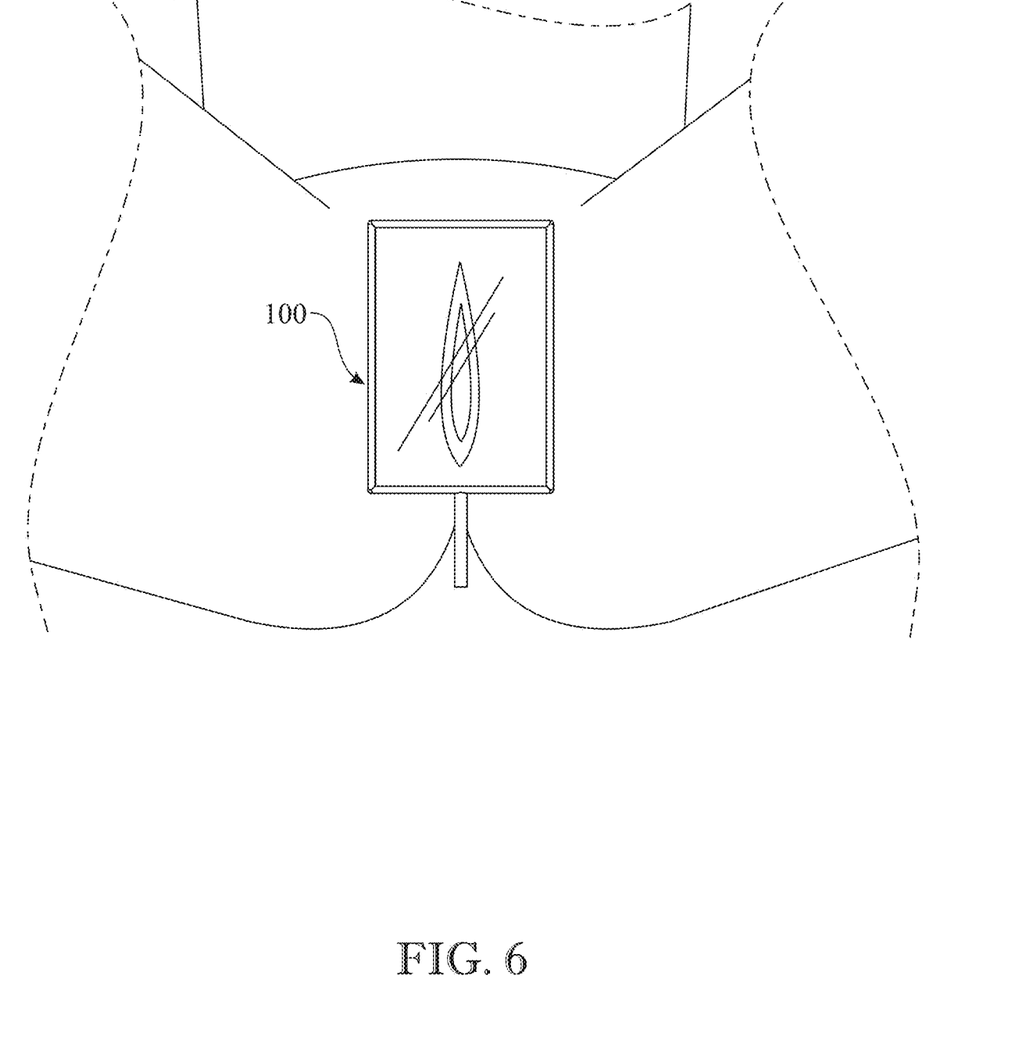
FIG. 6 presents a perspective view showing that the female genitalia protective sheath apparatus is used to cover the female genitalia according to an embodiment of the present invention.

According to an embodiment of the present invention, as illustrated in FIGS. 5-6, the stimulus pad 102, the first protective layer 104, and/or the second protective layer 106 may be configured to cover the female genitalia. The first protective layer 104 or the second protective layer 106 may be placed over the vagina when doing oral sex to a female. One of the first protective layer 104 and the second protective layer 106 may touch the vagina, while the other of the first protective layer 104 and the second protective layer 106 may face the person who performs the oral sex, such that vagina fluids may be prevented from being in contact with the person, and that the saliva may be prevented from being in touch with the vagina.

Figure 4:
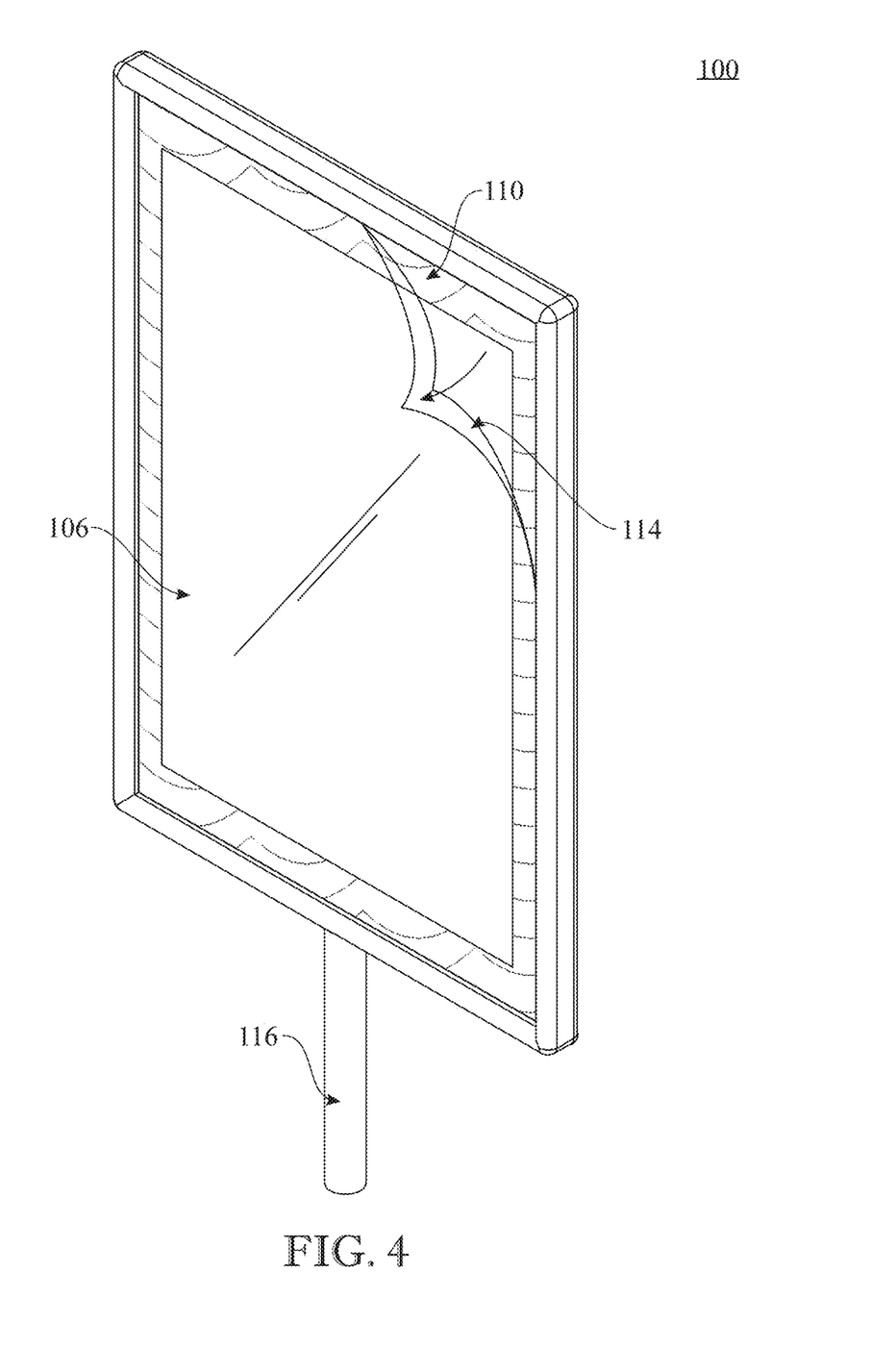
FIG. 4 presents a perspective view showing that a frame cover may be peelable from an adhesive frame according to an embodiment of the female genitalia protective sheath apparatus of the present invention.

According to an embodiment of the present invention, as illustrated in FIGS. 4 and 6, after the first frame cover 112 is peeled from the first adhesive frame 108, the first adhesive frame 108 may be configured to be adhered to the skin of the user, specifically the surrounding areas of the vagina, so as to keep the female genitalia protective sheath apparatus 100 in place.

According to an embodiment of the present invention, as illustrated in FIGS. 4 and 6, after the second frame cover 114 is peeled from the second adhesive frame 110, the second adhesive frame 110 may be configured to be adhered to the skin of the user, specifically the surrounding areas of the vagina, so as to keep the female genitalia protective sheath apparatus 100 in place.

The female genitalia protective sheath apparatus 100 provides a tool to practice oral sex to females in a safe way, limiting the transmissions of pathogens, viruses and STI's. The female genitalia protective sheath apparatus 100 has the potential to increase this practice which is not that common due to the act of sex is male dominant, nor having the female pleasure in consideration. As well the female genitalia protective sheath apparatus 100 has the potential to improve sexual relationships in couple's rooms intimacy. The female genitalia protective sheath apparatus 100 decreases the amount of sexual diseases transmissions attributed to oral sex practices to females. The female genitalia protective sheath apparatus 100 addresses the unsafety of oral sex act given to women.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A female genitalia protective sheath apparatus, comprising:
   a stimulus pad;
   a first protective layer superposed onto the stimulus pad;
   a second protective layer superposed onto the stimulus pad;
   a first adhesive frame fixed to a periphery of the first protective layer;
   a second adhesive frame fixed to a periphery of the second protective layer;
   a first frame cover removably attached to the first adhesive frame;
   a second frame cover removably attached to the second adhesive frame; and
   a handle laterally connected with the stimulus pad and at least one of the first protective layer and the second protective layer.

2. The female genitalia protective sheath apparatus of claim 1, wherein the stimulus pad is flexible and deformable, and comprises air bubbles, protrusions, or spikes on at least one surface thereof, arranged in various patterns or configurations, or is a ball pit sack that provides a wave motion stimulus.

3. The female genitalia protective sheath apparatus of claim 2, wherein the protrusions or spikes on the stimulus pad are configured to be used as tongue stimulus configurations, resembling sexual stimulators.

4. The female genitalia protective sheath apparatus of claim 2, wherein the protrusions on the stimulus pad are strings or little columns that move or return to their original position as the stimulus pad is touched or manipulated.

5. The female genitalia protective sheath apparatus of claim 2, wherein the ball pit sack stimulus pad comprises little balls that move when the stimulus pad is pressed.

6. The female genitalia protective sheath apparatus of claim 1, wherein the first adhesive frame and the second adhesive frame are oppositely located to the stimulus pad and comprise a sticky glue surface on a border of the respective protective layer.

7. The female genitalia protective sheath apparatus of claim 6, wherein the first adhesive frame and the second adhesive frame are configured to adhere to skin of a user, specifically surrounding areas of the vagina, to keep the apparatus in place after the respective frame cover is peeled.

8. The female genitalia protective sheath apparatus of claim 1, wherein the stimulus pad comprises at least one of latex, plastic, and rubber.

9. The female genitalia protective sheath apparatus of claim 1, wherein the first protective layer and the second protective layer comprise plastic materials and are flexible and deformable.

10. The female genitalia protective sheath apparatus of claim 1, wherein the stimulus pad is located between the first protective layer and the second protective layer.

11. The female genitalia protective sheath apparatus of claim 1, wherein the first frame cover and the second frame cover comprise paper materials and are peelable from the respective adhesive frame.

12. The female genitalia protective sheath apparatus of claim 1, wherein the handle comprises rigid materials.

13. The female genitalia protective sheath apparatus of claim 1, wherein the apparatus is configured to cover the female genitalia such that one of the first protective layer and the second protective layer touches a vagina while the other faces a person performing oral sex, preventing contact between vagina fluids and the person's saliva.

14. A female genitalia protective sheath apparatus of claim 1, wherein the first frame cover and the second frame cover are configured to maintain the sterility of the first adhesive frame and the second adhesive frame before use.

15. The female genitalia protective sheath apparatus of claim 1, wherein the apparatus promotes safer oral sex practices for females, reducing the transmission of pathogens, viruses, and sexually transmitted infections (STIs).

16. A method of using a female genitalia protective sheath apparatus, comprising:
   providing a female genitalia protective sheath apparatus having a stimulus pad, a first protective layer superposed onto the stimulus pad, a second protective layer superposed onto the stimulus pad, a first adhesive frame fixed to a periphery of the first protective layer, a second adhesive frame fixed to a periphery of the second protective layer, a first frame cover removably attached to the first adhesive frame, a second frame cover removably attached to the second adhesive frame, and a handle laterally connected with the stimulus pad and at least one of the first protective layer and the second protective layer;

peeling the first frame cover from the first adhesive frame;

peeling the second frame cover from the second adhesive frame;

adhering the first adhesive frame and the second adhesive frame to the skin of a user, specifically the surrounding areas of the vagina;

covering the female genitalia with the apparatus, such that one of the first protective layer and the second protective layer touches a vagina while the other faces a person performing oral sex, preventing contact between vagina fluids and the person's saliva; and manipulating the apparatus by holding the handle during use.

17. The method of claim 16, further comprising selecting the stimulus pad with desired materials, patterns, or configurations for a user's preference and comfort.

18. A female genitalia protective sheath apparatus, comprising:

a stimulus pad, the stimulus pad being flexible and deformable, and comprising air bubbles, protrusions, or spikes on at least one surface thereof, arranged in various patterns or configurations, or wherein the stimulus pad is a ball pit sack that provides a wave motion stimulus;

a first protective layer and a second protective layer superposed onto the stimulus pad, wherein the first protective layer and the second protective layer comprise plastic materials and are flexible and deformable;

a first adhesive frame fixed to a periphery of the first protective layer and a second adhesive frame fixed to a periphery of the second protective layer, wherein the first adhesive frame and the second adhesive frame are oppositely located to the stimulus pad and comprise a sticky glue surface on a border of the respective protective layer;

a first frame cover removably attached to the first adhesive frame and a second frame cover removably attached to the second adhesive frame, wherein the first frame cover and the second frame cover comprise paper materials and are peelable from the respective adhesive frame; and a handle laterally connected with the stimulus pad and at least one of the first protective layer and the second protective layer.

\* \* \* \* \*